nn(12) United States Patent
Grube et al.

(10) Patent No.: US 8,357,048 B2
(45) Date of Patent: Jan. 22, 2013

(54) INTERACTIVE GAMING UTILIZING A DISPERSED STORAGE NETWORK

(75) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 266 days.

(21) Appl. No.: 12/789,461

(22) Filed: May 28, 2010

(65) Prior Publication Data

US 2011/0077086 A1   Mar. 31, 2011

Related U.S. Application Data

(60) Provisional application No. 61/246,818, filed on Sep. 29, 2009.

(51) Int. Cl.
*G06F 17/00* (2006.01)

(52) U.S. Cl. ............................................ 463/43; 463/42

(58) Field of Classification Search ............ 463/42, 463/43
See application file for complete search history.

(56) References Cited

U.S. PATENT DOCUMENTS

| | | | |
|---|---|---|---|
| 4,092,732 A | 5/1978 | Ouchi | |
| 4,644,529 A * | 2/1987 | Amstutz et al. | 370/422 |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,984,787 A * | 11/1999 | Redpath | 463/42 |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Michael Cuff

(74) *Attorney, Agent, or Firm* — Garlick & Markison; Bruce E. Stuckman

(57) ABSTRACT

Game data is received at a dispersed storage processing unit, the game data associated with at least one of a plurality of user devices. The game data is stored in a cache memory associated with the dispersed storage processing unit. Dispersed storage metadata associated with the cached game data is generated. A data block is generated based on the cached game data and further based on the dispersed storage metadata. The data block is stored in a dispersed storage network.

10 Claims, 10 Drawing Sheets

U.S. PATENT DOCUMENTS

| | | | |
|---|---|---|---|
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,437,507 B2 * | 10/2008 | Sharma et al. | 711/114 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0183975 A1 * | 7/2008 | Foster et al. | 711/153 |
| 2008/0207306 A1 * | 8/2008 | Higbie | 463/23 |
| 2008/0287195 A1 * | 11/2008 | Lee et al. | 463/42 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0248843 A1 * | 9/2010 | Karsten | 463/43 |
| 2010/0317443 A1 * | 12/2010 | Cook et al. | 463/42 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

INTERACTIVE GAMING UTILIZING A DISPERSED STORAGE NETWORK

CROSS REFERENCE TO RELATED PATENTS

The present U.S. Utility Patent Application claims priority pursuant to 35 U.S.C. §119(e) to U.S. Provisional Application Ser. No. 61/246,818, entitled "SOCIAL NETWORKING UTILIZING A DISTRIBUTED STORAGE NETWORK", filed Sep. 29, 2009, which is incorporated herein by reference in its entirety and made part of the present U.S. Utility Patent Application for all purposes.

The present application is related to the U.S. Patent Application entitled, SOCIAL NETWORKING UTILIZING A DISPERSED STORAGE NETWORK, filed on May 28, 2010, and application Ser. No. 12/789,459.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

DETAILED DESCRIPTION OF THE INVENTION

Figure 1:
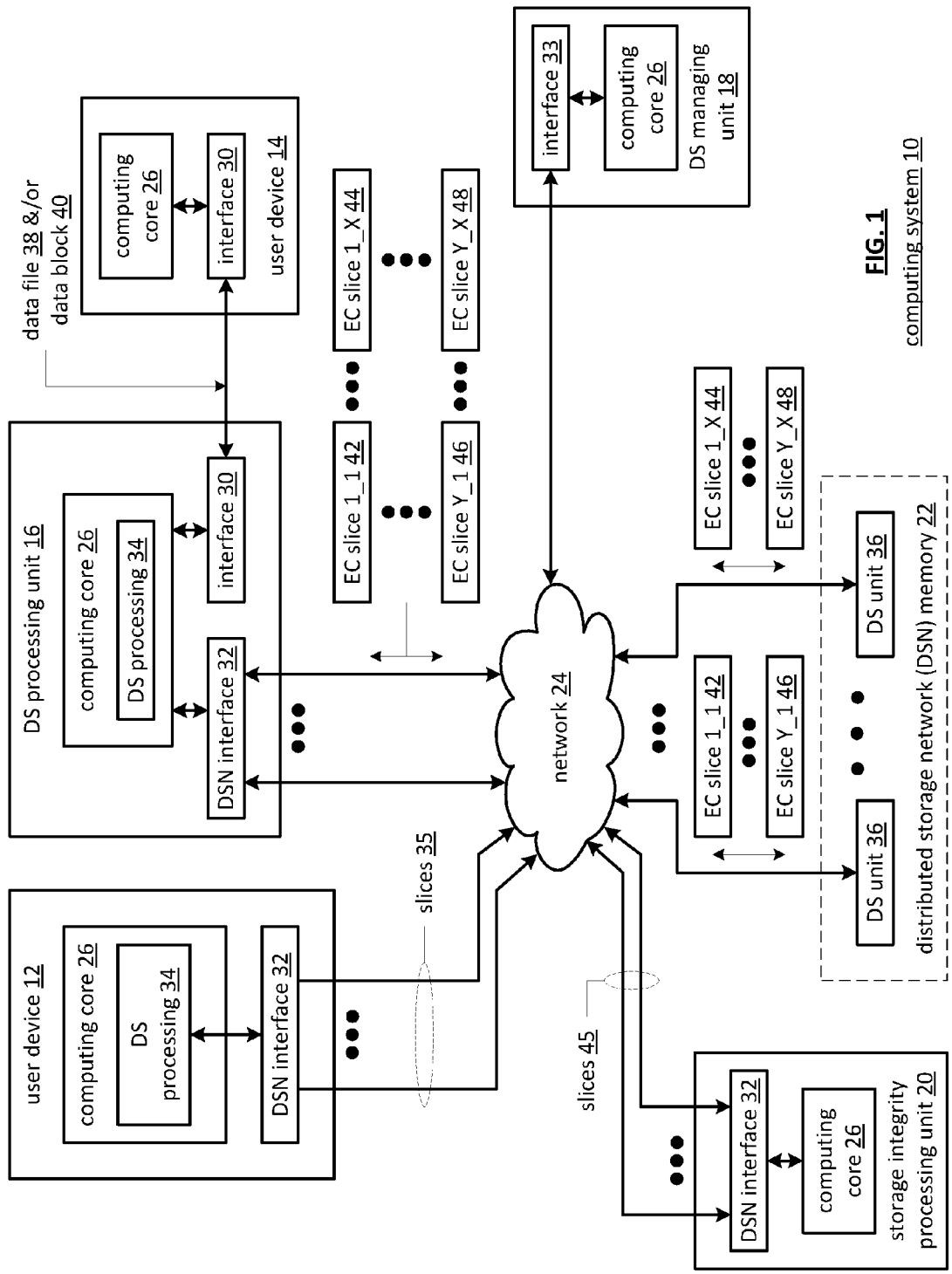
FIG. 1 is a schematic block diagram of an embodiment of a computing system 10 in accordance with the invention.

FIG. 1 is a schematic block diagram of a computing system 10 that includes one or more of a first type of user devices 12, one or more of a second type of user devices 14, at least one dispersed storage (DS) processing unit 16, at least one DS managing unit 18, at least one storage integrity processing unit 20, and a dispersed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of dispersed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-11.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, dispersed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for dispersed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a dispersed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of Figures that follow.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

In an embodiment of the present invention, the DS processing unit 16 can be implemented in either server such as a game server or social networking server or a separate user device that operates in conjunction with such a server to play a game, such as a multiplayer game or engage in social networking. In particular, the DS processing unit 16 can coordinate the storage and retrieval of data, such as gaming data or social networking data, via a dispersed storage network. Further examples of such a DS processing unit 16 and dispersed storage network including many optional functions and features are described in conjunction with FIGS. 2-11 that follow.

Figure 2:
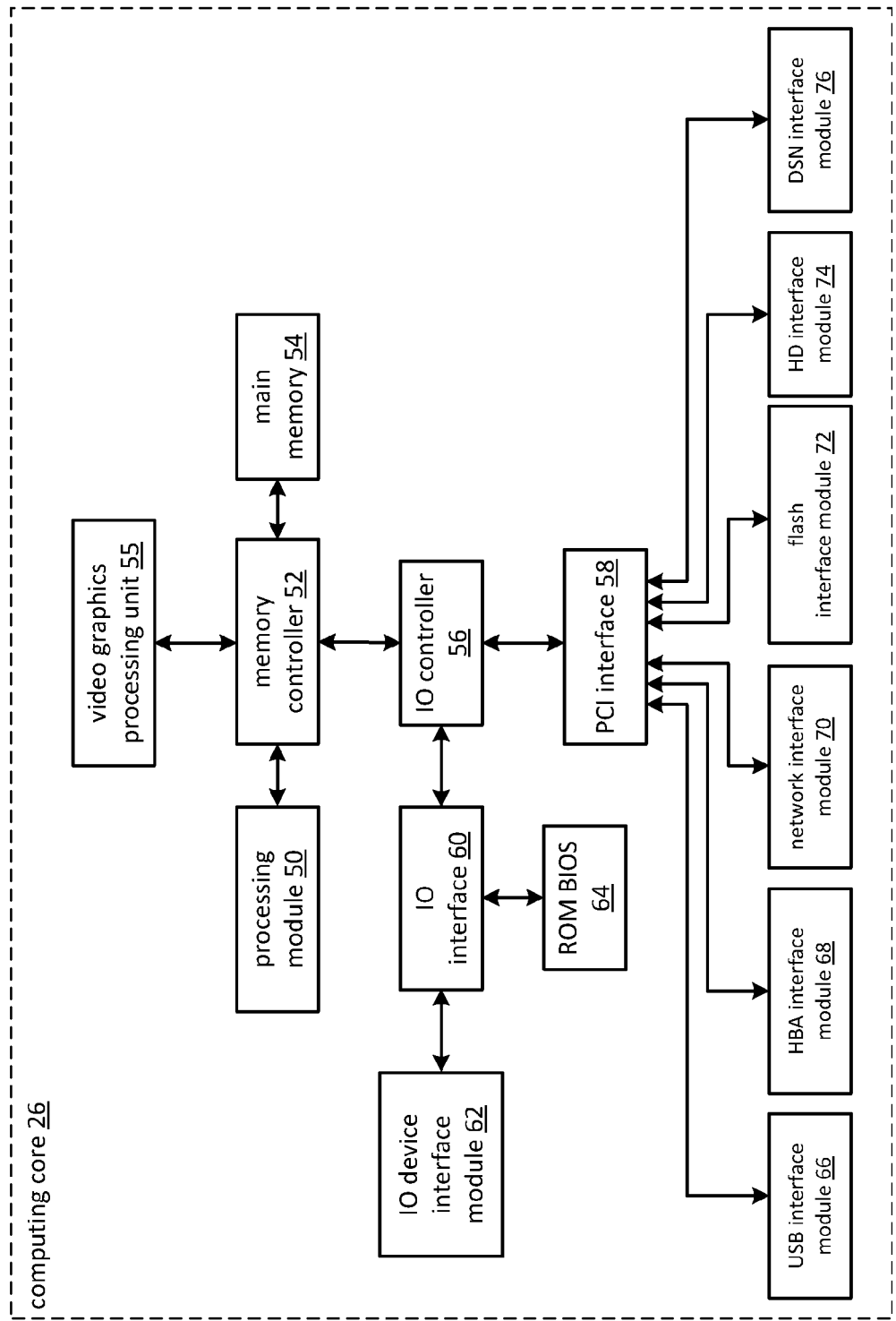
FIG. 2 is a schematic block diagram of an embodiment of a computing core 26 in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-11.

Figure 3:
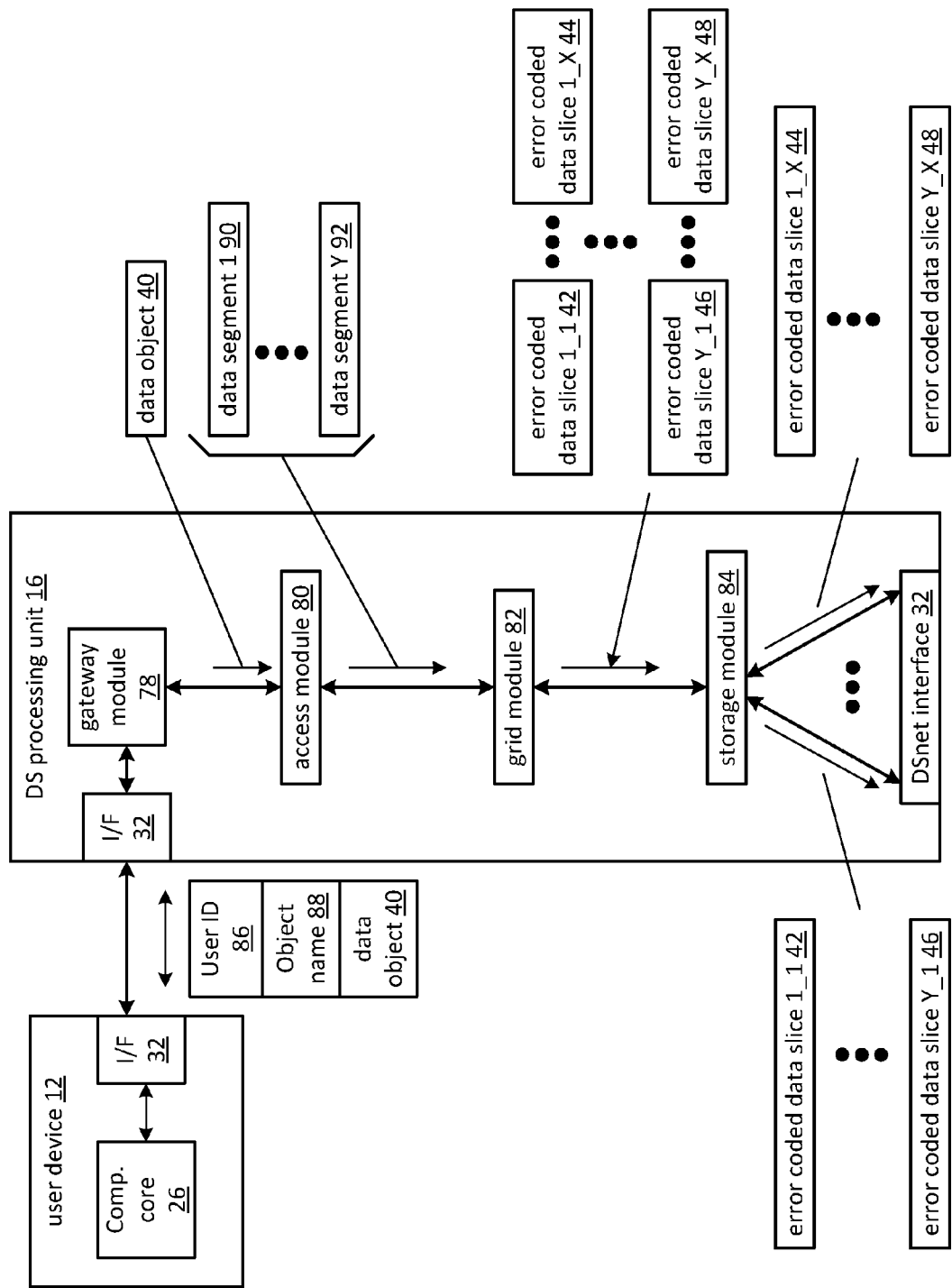
FIG. 3 is a schematic block diagram of an embodiment of a dispersed storage processing unit 16 in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78.

In an example of storing data, the gateway module 78 receives an incoming data object (e.g., a data file, a data block, an EC data slice, etc.) that includes a user ID field 86, an object name field 88, and the data field 40. The gateway module 78 authenticates the user associated with the data object by verifying the user ID 86 with the managing unit 18 and/or another authenticating unit. When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module uses the user information to assign a source name to the data. For instance, the gateway module 60 determines the source name of the data object 40 based on the vault identifier and the data object. For example, the source name may contain a data name (block number or a file number), the vault generation number, the reserved field, and the vault identifier. The data name may be randomly assigned but is associated with the user data object.

The access module 62 receives the data object 40 and creates a series of data segments 1 through Y 90-92 therefrom. The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 82 may pre-manipulate (e.g., compression, encryption, cyclic redundancy check (CRC), etc.) each of the data segments before performing an error coding function of the error coding dispersal storage function to produce a pre-manipulated data segment. The grid module 82 then error encodes (e.g., Reed-Solomon, Convolution encoding, Trellis encoding, etc.) the data segment or pre-manipulated data segment into X error coded data slices 42-44. The grid module 64 determines a unique slice name for each error coded data slice and attaches it to the data slice.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

The grid module 82 also determines which of the DS storage units 36 will store the EC data slices based on a dispersed storage memory mapping associated with the user's vault and/or DS storage unit 36 attributes. The DS storage unit attributes includes availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the EC data slices and, when successful, transmits the EC data slices 1 through X of each segment 1 through Y to the DS Storage units. Each of the DS storage units 36 stores its EC data slice and keeps a table to convert the virtual DSN address of the EC data slice into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
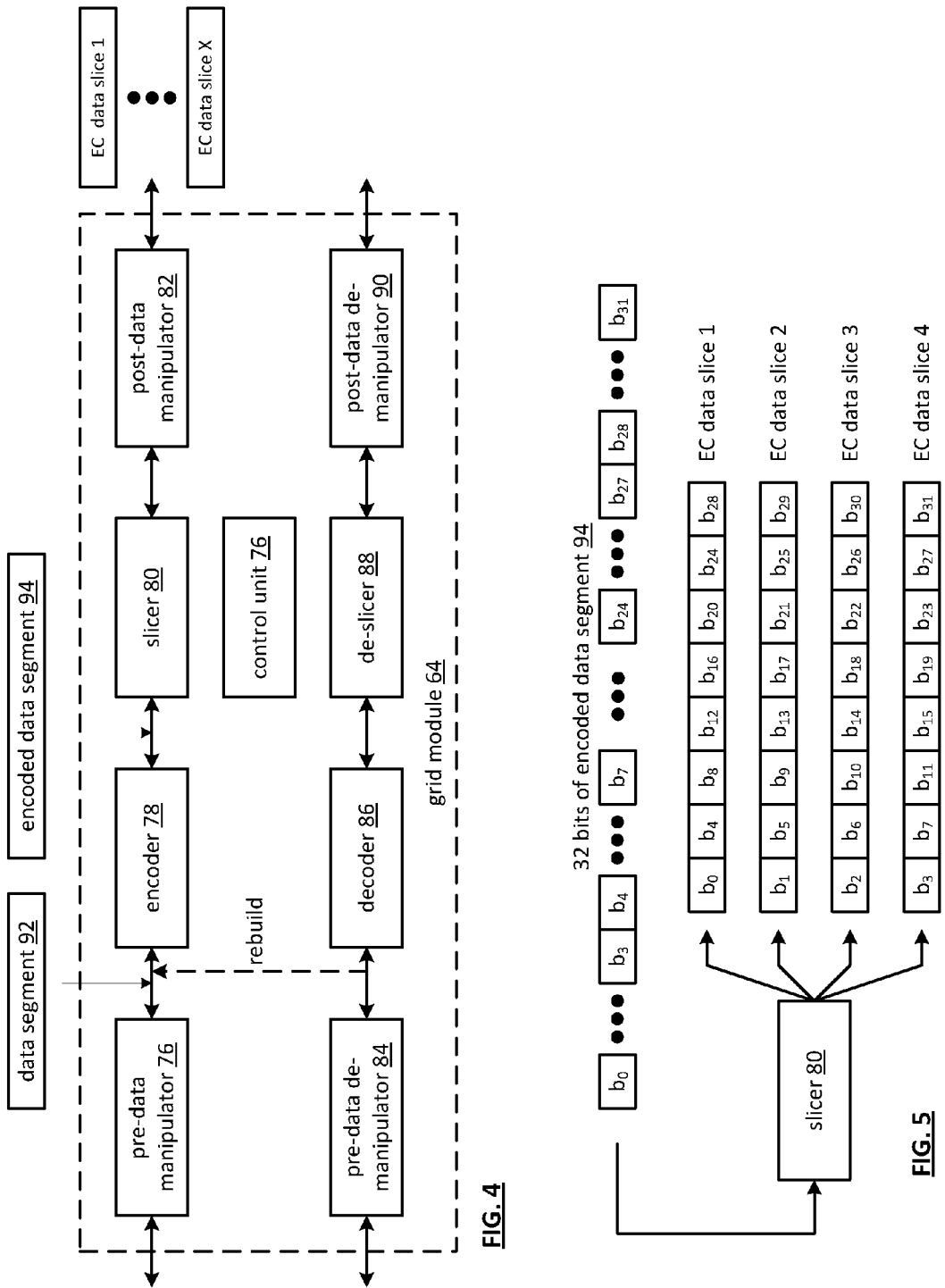
FIG. 4 is a schematic block diagram of an embodiment of a grid module 64 in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-data manipulator 75, an encoder 77, a slicer 79, a post-data manipulator 81, a pre-data de-manipulator 83, a decoder 85, a de-slicer 87, and/or a post-data de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-data manipulator 75 receives a data segment 90-92 and a write instruction from an authorized user device. The pre-data manipulator 75 determines if pre-manipulation of the data segment 90-92 is required and, if so, what type. The pre-data manipulator 75 may make the determination independently or based on instructions from the control unit 73, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of d*(X/T), where d is size of the data segment 92, X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-data manipulator 81 performs, if enabled, post-manipulation on the encoded slices to produce the EC data slices. If enabled, the post-data manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system.

In an example of a read operation, the post-data de-manipulator 89 receives at least a read threshold number of EC data slices and performs the inverse function of the post-data manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-data de-manipulator 83 performs the inverse function of the pre-data manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
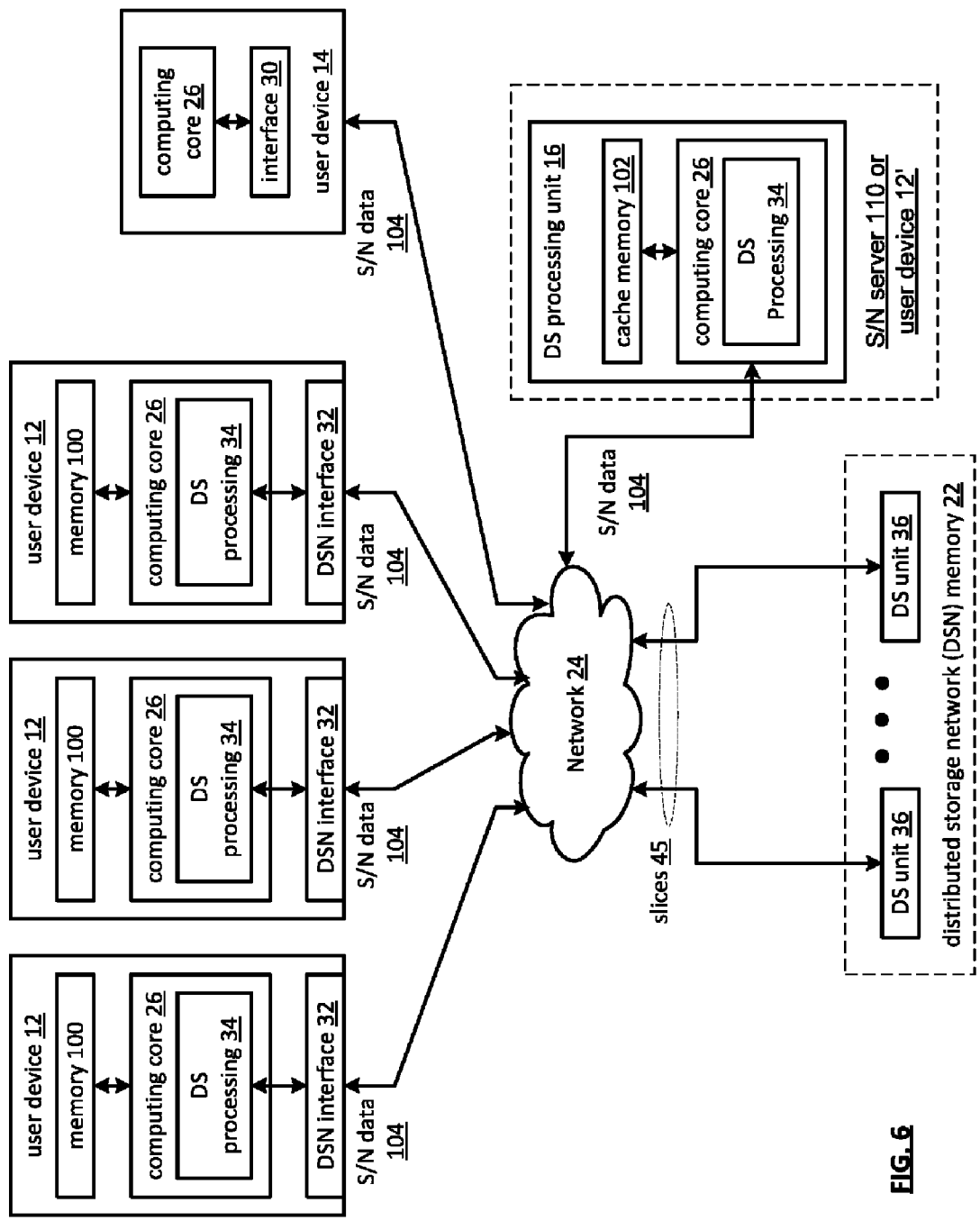
FIG. 6 is a schematic block diagram of another embodiment of a computing system in accordance with the invention.

FIG. 6 is a schematic block diagram of another embodiment of a computing system that includes a plurality of user devices 12 and 14, the network 24, a DS processing unit 16, and the DSN memory 32. As shown, DS processing unit 16 is included in either a social networking server 110 that supports the operation of one or more social networking applications or is included in a user device 12' that operates as user device 12 and further supports the operation of one or more social networking applications.

The plurality of user devices 12 and 14 includes the computing core 26 as previously described to support DS processing 34 and other functions such as social networking applications. In addition, one or more user devices 12 further include a memory 100 operating in a similar fashion to DS units 36 to store dispersed storage data. For example, the computing core 26 executes the social networking application and optionally stores social networking data 104 (e.g., messages, media) in the memory 100.

The DS processing unit 16 includes the computing core 26 and cache memory 102 to support DS processing 34 and other functions such as social applications. For example, the computing core 26 executes the social networking application and stores, in the cache memory 102, the social networking data 104.

The plurality of user devices 12 or 14 may communicate data with each other, the DS processing unit 16, and/or the DSN memory 22 via the network 24. The data may be comprised of EC data slices compatible with the dispersed storage network. The data may represent social networking data 104. The DSN memory 22 includes the plurality of DS units 36 and may functionally include one or more of the memories of the plurality of user devices 12 to store slices. For instance, the plurality of user devices 12 may function as DS units 36 storing slices. DS units 36 may be geographically aligned with locations of groups of user devices 12. For example, twenty DS units 36 may be aligned in Chicago where there are two hundred thousand user devices 12 or 14 that actively participate in a first social networking group, and ten DS units 36 may be aligned in Milwaukee where there are one hundred thousand user devices that actively participate in a second social networking group.

In an example of operation, the user device creates social networking data 104 and sends it to the DS processing unit 16. The DS processing unit 16 processes the social networking data 104 to produce processed information (e.g., a summary, linkage to other threads, ads, flags, game status, etc.). The DS processing unit 16 creates EC data slices 45 based on the processed information. The DS processing unit 16 sends the EC data slices 45 to the DSN memory 22 with a store command. At least one of the user devices 12 or 14 may send a message to the DS processing unit 16 that contains a request for processed information. The DS processing unit 16 may push or otherwise send a portion of the processed information and/or the EC data slices 45 of the processed information to one or more of the user devices 12 or 14 based on the request and/or based on another factor (e.g., a push data indicator, from time to time, topic, a priority, content of the processed social networking data, etc.).

In another example of operation, the DS processing unit 16 is implemented in a user device 12 or 14' that creates social networking data 104 and processes the social networking data 104 to produce processed information. The user device 12' creates EC data slices 45 based on the processed information. The user device 12' sends the EC data slices 45 to the DSN memory 22 with a store command. At least one of the other user devices 12 or 14 may send a message to the user device 12' that contains a request for processed information. The user device 12' may push or otherwise send a portion of the processed information and/or the EC data slices 45 of the processed information to one or more of the other user devices 12 or 14 based on the request and/or based on another factor (e.g., a push data indicator, from time to time, topic, a priority, content of the processed social networking data, etc.).

In a further example of operation, the dispersed storage processing unit 16 receives social networking data 104 that is generated internally when implemented as part of user device 12' or received from one or more of the user devices 12 or 14. The social networking data 104 can include a social group identifier, names, places, times, dates, statistics, user profile information, blog data or other text, images, video, graphics or messages or other social networking information. Dispersed storage metadata associated with the social networking data is generated by the dispersed storage processing unit 16. In addition, a full record and one or more partial records are generated by the dispersed storage processing unit 16, based on the social networking data 114 and further based on the dispersed storage metadata. The full record is processed to create EC slices 45 and stored in the dispersed storage network, in either DS units 36 or one or more memories 100.

The partial record or records can include the dispersed storage metadata, a summary of the full record and a link to the full record. Summary information can include a title, key points, fragments of text, thumbnails or other reduced resolution of graphics, images or video, or other information that can inform users as to the content or subject matter of the full record, prior to access to the full record itself. The partial records can be pushed or otherwise sent to one or more of the other user devices 12 or 14 via the network 24. In this fashion, a summary of the full information can be sent to users for review. Users that are interested in reviewing the full record can, for instance, request the full record from the dispersed storage processing unit 16, which then proceeds to retrieve the full record from the dispersed storage network as previously described. In addition, the partial records can also be processed to create EC slices 45 and stored in the dispersed storage network, in either DS units 36 or one or more memories 100.

The dispersed storage processing unit 16 can utilize cache memory 102 for temporary storage of the social networking data 104 until full records and partial records are generated. In one mode of operation, social networking data 104 can be accumulated in the cache memory 102 until a sufficient amount of data is stored. For example, social network data 104 can be accumulated until a full record is received, or until a number of full records are generated and cached that correspond to the desired size of a data block. In other examples of operation, the dispersed storage processing unit 16 can track and update a remaining cache capacity of the cache and trigger either the generation of full and partial records or the dispersed storage of full and partial records, when the remaining cache capacity exceeds a threshold.

In a further mode of operation, dispersed storage processing unit 16 can include a timer that tracks the time since the receipt of the last social networking data 104. Full and partial records can be generated and stored and the cache can be purged when no additional social networking data 104 has been received within a time out period. In another mode of operation, the full record can be generated and cached for a limited period of time to wait to see if it is requested by a user of a user device 12 or 14 that has just received a partial record that corresponds to the full record. If the full record has not been requested within the limited time period, as determined by the expiration of a time out period, the full record can be processed into EC slices 45 and stored in the dispersed storage network.

In another example of operation, the dispersed storage processing unit 16 can choose where the EC slices 45 of full record and partial records will be stored, based on information associated with the social networking data 104. In an embodiment of the present invention, the social networking application associates the users of user devices into affinity groups, by location (e.g. Chicago, or Milwaukee, etc.), areas of interest (e.g. Dodge Viper owners), professional data (e.g. U.S. patent attorneys) demographic data (singles between the ages of 25 and 40), other criteria or combinations thereof. These affinity groups can also be self formed. For example, users may send invitations for membership in affinity group or receive requests for entry in the group and be admitted to the group upon acceptance by a group administrator or other authorized user. In another mode of operation, affinity groups can be automatically formed by the social networking application by comparing user profiles and clustering users. For instance, the social networking application can compare a profile associated with a user with stored profiles associated other users to determine if a new affinity group should be formed or a user should be added to an affinity group that contains other users.

A number of dispersed storage units 36 (or memories 100) can be associated with a particular affinity group based on a group ID or other identifier. When social networking data 104 is received from a user of a particular user device 12 or 14, an affinity group that is associated with the user, the user device 12 or 14, a group ID included within the social networking data 104 or indicated by the subject matter of the social networking data 104 itself, can be identified by the dispersed storage processing unit 16 and used to determine the particular dispersed storage units 36 or memories 100 to be used to store the EC slices 45 generated therefrom. For example, the dispersed storage processing unit 16 can determine a user, via their association with the user device that generated the social network data 104 or from data contained in the social networking data itself. An affinity group can be identified that includes the user and the dispersed storage processing unit 16 can determine the particular dispersed storage units 36 or memories 100 to be used to store the social networking data 104 based on their association with the affinity group that is identified.

In another example of operation, dispersed storage units 36 or memories 100 can be associated to user devices 12 or 14 or particular users based on other criteria such as subscription data, fee structures, a desired level of data integrity or security, geographical location or other criteria. In this further example, the dispersed storage processing unit 16 uses these associations to determine the particular dispersed storage units 36 or memories 100 to be used to store the EC slices 45 generated therefrom.

As discussed above, partial records formed from the social networking data 104 can be sent to other users for review. In one example of operation, the affinity group associated with the user that generated the social networking data can be used to determine which other users to send the partial record to. In particular, an affinity group can be identified that includes the user and the dispersed storage processing unit 16 can determine the particular other users to send the partial record to, based on their association with the affinity group that is identified. Further, the dispersed storage processing unit 16 can determine which of the other users in the affinity group are currently coupled to the dispersed storage processing unit via the data network, via for instance, by period polling, by determining which users are currently logged in, etc. The network address associated with the current users in the affinity group can be determined based on the user device 12 or 14 associated with these users. This network address, such as a MAC address, device address, IP address or other address can be used to route the partial address to the users of the affinity group that are currently on-line.

After social networking data 104 has been received and processed in any of the methods as described above, the dispersed storage processing unit 16 can receive a request for the social networking data 104 from one of the user devices 12 or 14. As discussed above, the if particular user device above had received a partial record associated with the social networking data, the user device could follow a link to retrieve the full record, either from the memory cache 102 of the dispersed storage processing unit 16 or via retrieval from the dispersed storage network via the dispersed storage processing unit 16.

In circumstances where a user device 12 or 14, without access to the partial record, requests the corresponding social networking data 104, the dispersed storage processing unit 16 can retrieve the partial record from the dispersed storage network in response to the request and send the partial record to the requesting user device 12 or 14 via the network 24. In an example of operation, the dispersed storage processing unit 16 can, at the same time, retrieve and store the full record in cache memory 102. In this fashion, should the user device 12 or 14 review the partial record and request the full record from the dispersed storage processing unit 16, the full record can be quickly retrieved from the cache memory 102 and sent to the requesting user device 12 or 14 via the network 24. The full record can be purged from the cache memory 102 of the dispersed storage processing unit 16 after fulfilling the request for the full record, or after the expiration of a time out period when no request for the full record has been received.

In one mode of operation, the request for social networking data 104 from a user device is a general request. In response to the request, the dispersed storage processing unit 16 can determines which partial record or records to retrieve, based on the request. For example, the dispersed storage processing unit 16 can analyze the request to determine a user associated with the request, determine a particular affinity group that includes that particular user and identify one or more partial records associated with that particular affinity group. In another example, the request for social networking data can include an identification of one or more affinity groups associated with the user for which social networking data 104 is sought.

Further examples of creation and distribution of social networking data 104, including several optional functions and features will be discussed in greater detail with reference to FIGS. 7-8.

Further examples of creation and distribution of social networking data 104 and gaming data 114, including several optional functions and features will be discussed in greater detail with reference to FIGS. 10-11.

Figure 7:
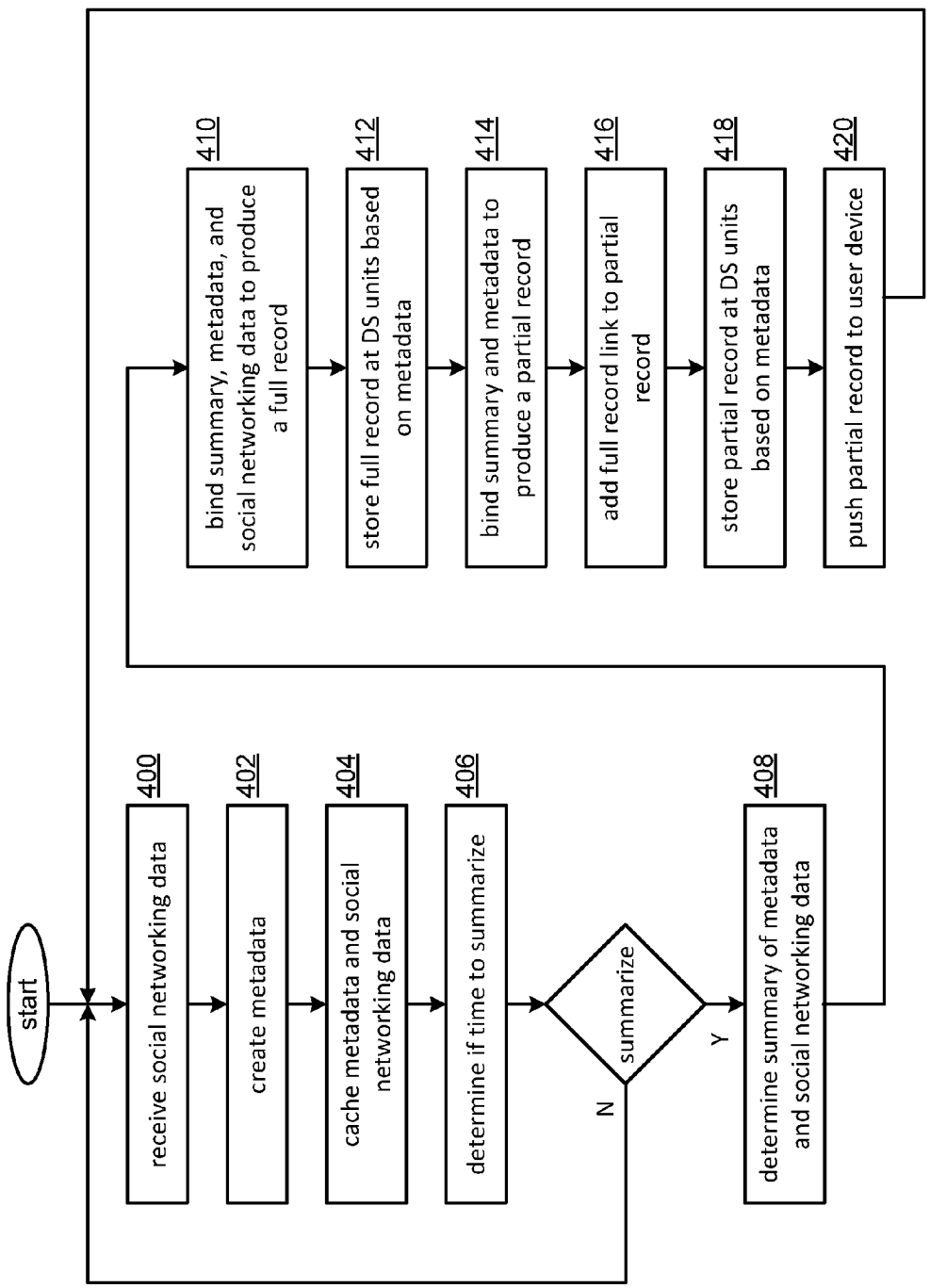
FIG. 7 is a flowchart illustrating the storing of social networking data in accordance with an embodiment of the invention.

FIG. 7 is a flowchart illustrating the storing of social networking data by the DS processing unit and/or user device, such as DS processing unit 16 and/or user device 12 or 14. The DS processing unit receives social networking data as shown in step 400, such as social networking data 104. The social networking data may be received from one or more of the user devices, another DS processing unit, and/or a source external to the computing system. The social networking data may include one or more of a social group identifier (ID), a user ID, a message, a media file, a timestamp, a link to other social networking data or processed information, etc.

In step 402, the DS processing unit creates metadata based on the social networking data. The metadata may include one or more of the social group ID, the user ID, key words based on the message, a reference to the media file, the timestamp, the link to other social networking data or processed information. The key words may include one or more of names, places, phrases, dates, times, etc.

In step 404, the DS processing unit stores the social networking data and metadata in the cache memory by appending it to any similar previously stored social networking data and metadata. Note that as time goes on the use of the cache will grow. For example, the cache may grow for a group of users utilizing the same social group ID as user devices send social networking data to the DS processing unit.

In step 406, the DS processing unit determines if it is time to summarize the previously stored social networking data and metadata. The determination may be based on one or more of cache memory utilization has reached a threshold, a request, and/or a time period has elapsed since the last summary of the similar previously stored social networking data and metadata. The DS processing unit continues to receive social networking data when the DS processing unit determines it is not time to summarize the previously stored social networking data and metadata.

As shown in step 408, the DS processing unit determines a summary of the previously stored social networking data and metadata when the DS processing unit determines if it is time to summarize the previously stored social networking data and metadata. The determination may be based on a decomposition of the previously stored social networking data and metadata into a shorter version of the key points in accordance with analytic rules. The analytic rules may pertain to any one or more of the social group ID, the user ID, key words based on the message, the reference to the media file, and/or the timestamp. For example, the analytic rules may influence the decomposition to identify key words related to cars if the social group ID references a car affinity (e.g., a car club).

As shown in step 410, the DS processing unit binds the summary, the metadata, and the social networking data to produce a full record. The DS processing unit determines what part of the DSN memory to utilize to store the full record. The determination may be based on the metadata and/or the availability of the DSN memory. For example, the DS processing unit may choose DS units in Milwaukee and memory of user devices affiliated with a social group ID of 457 in Milwaukee when a full record pertaining to social group ID 457 is to be stored and social group ID 457 is affiliated with Milwaukee.

In step 412, the DS processing unit creates EC data slices of the full record and sends the slices to the chosen portion of the DSN memory (e.g., DS units and/or memory of one or more user devices) with a store command.

In step 414, the DS processing unit binds the summary and the metadata to produce a partial record. In step 416, the DS processing unit adds a full record link to the partial record where the full record corresponds to the partial record (e.g., a DSN memory logical address for the full record containing the same summary and metadata).

The DS processing unit determines what part of the DSN memory to utilize to store the partial record. The determination may be based on the metadata and/or the availability and performance of the DSN memory. For example, the DS processing unit may choose DSN memory that will provide the fastest subsequent retrievals for the most likely user devices to request the partial record.

In step 418, the DS processing unit creates EC data slices of the partial record and sends the slices to the chosen portion of the DSN memory (e.g., DS units and/or memory of one or more user devices) with a store command. The DS processing unit may send the partial record to user devices affiliated with the social group ID as shown in step 420.

Figure 8:
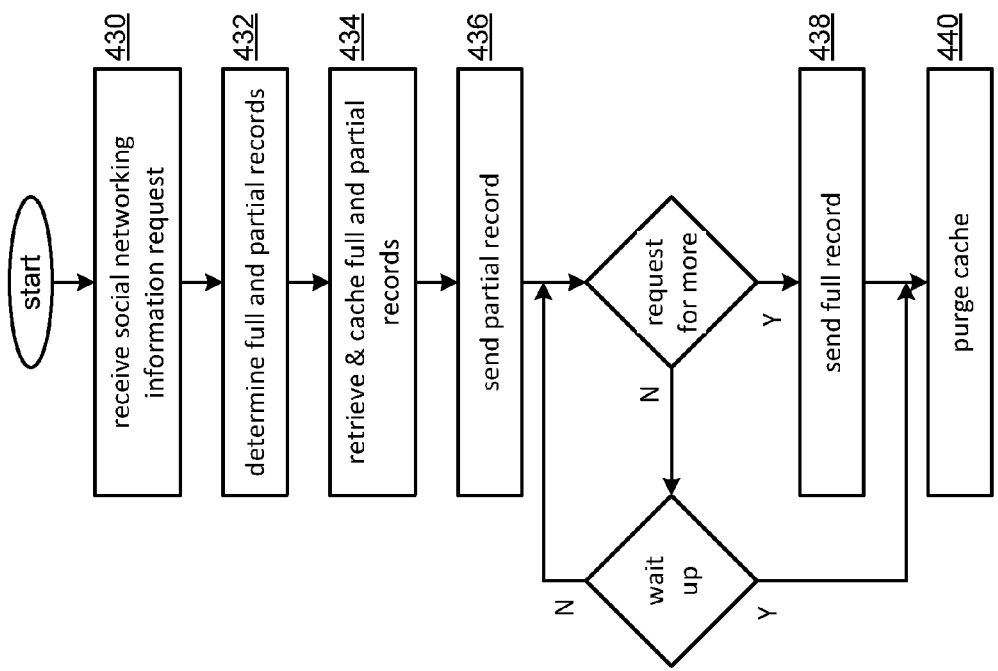
FIG. 8 is a flowchart illustrating the retrieving of social networking information in accordance with an embodiment of the invention.

FIG. 8 is a flowchart illustrating the retrieving of social networking information where the DS processing unit, such as DS processing unit 16, receives a social networking information request from a requester as shown in step 430. The requester may be one or more of the user devices 12 or 14, another DS processing unit 16, and/or a source external to the computing system. The desired social networking information may comprise a portion of the partial record and/or a portion of the full record. The social networking information request may include the social group ID, key search words, time ranges, record identifiers, etc.

In step 432, the DS processing unit determines the full and partial records based on searching and matching partial records to the social networking information request. The DS processing unit searches for partial records by matching the request to partial records that are most likely to contain the desired information. For example, the request may indicate the domain of social group 457. The DS processing unit determines the DSN memory locations where partial records are stored as slices based on a vault assignment for social group 457. The DS processing unit retrieves the slices, de-slices and decodes the slices into partial records. The DS processing unit searches the partial records for the best matches.

The DS processing unit determines the associated full record based on the full record link within the partial record. The DS processing unit determines the DSN memory locations where slices for full records are stored. The DS processing unit retrieves the slices, de-slices and decodes the slices into full records. The DS processing unit saves the full and partial records in cache memory as shown in step 434.

In step 436, the DS processing unit sends the partial record to the requester in response to the social networking information request. In another embodiment, the DS processing unit creates EC data slices based on the partial record and sends the slices to a different portion of the DSN memory. The DS processing unit sends a message to the requester containing the virtual address of the different portion of the DSN memory such that the requester can subsequently retrieve the partial record. In yet another embodiment, the DS processing unit sends a message to the requester containing the virtual address of the DSN memory where the DS processing unit retrieved the partial record such that the requester can subsequently directly retrieve the partial record.

The DS processing unit may wait for a period of time to receive a request for more information from the requester. In step 440, the DS processing unit purges the cache memory when the DS processing unit determines that the wait is up and there was no request received for more information.

In step 438, the DS processing unit sends the full record to the requester when the DS processing unit determines that the request for more information was received and the wait time was not up. In another embodiment, the DS processing unit creates EC data slices based on the full record and sends the slices to a different portion of the DSN memory. The DS processing unit sends a message to the requester containing the virtual address of the different portion of the DSN memory such that the requester can subsequently retrieve the full record. In yet another embodiment, the DS processing unit sends a message to the requester containing the virtual address of the DSN memory where the DS processing unit retrieved the full record such that the requester can subsequently directly retrieve the full record. The DS processing unit then purges the cache memory.

Figure 9:
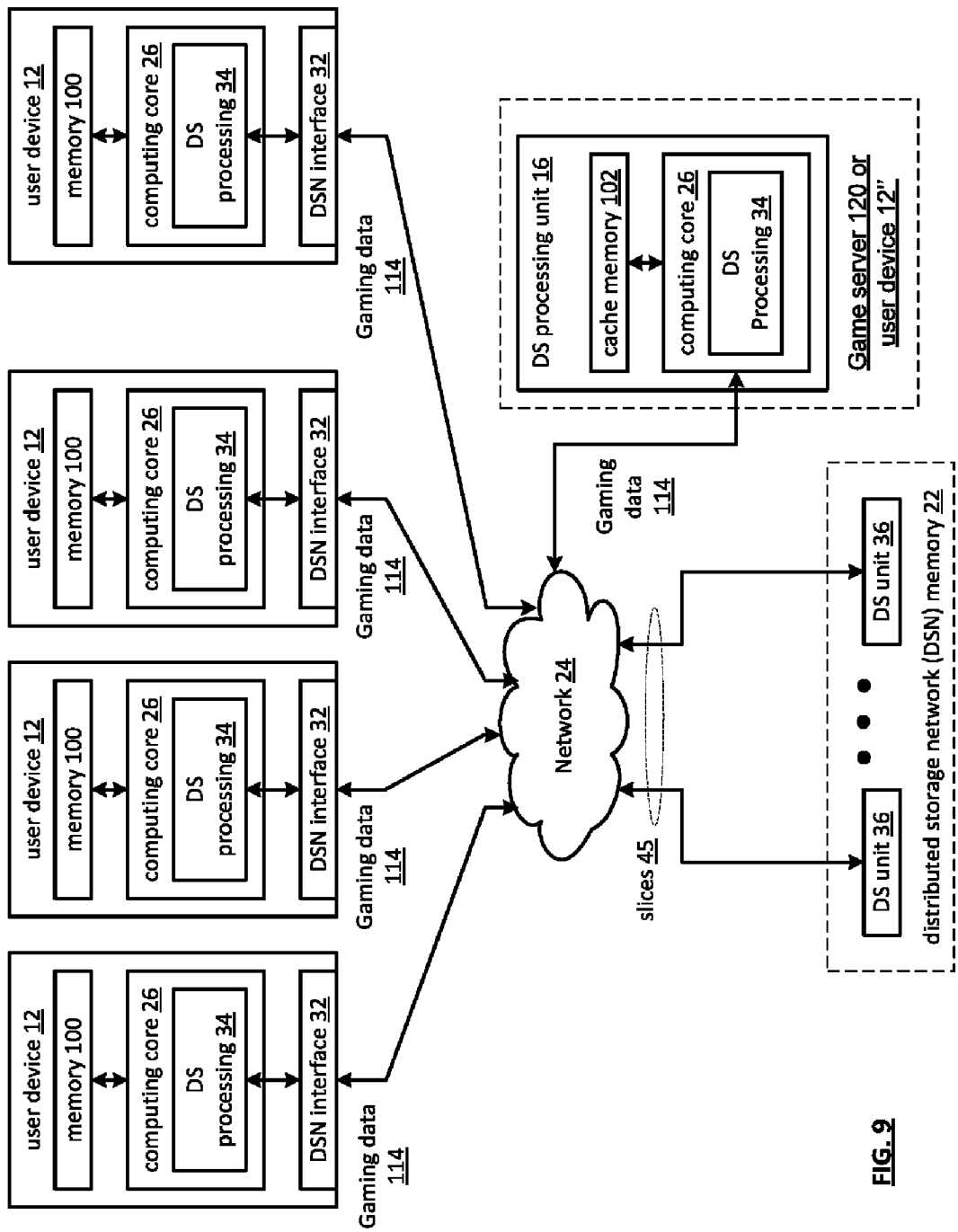
FIG. 9 is a schematic block diagram of another embodiment of a computing system in accordance with the invention.

FIG. 9 is a schematic block diagram of another embodiment of a computing system that includes a plurality of user devices 12 and 14, the network 24, a DS processing unit 16, and the DSN memory 32. As shown, DS processing unit 16 is included in either a game server 120 that supports the operation of one or more interactive games or is included in a user device 12' that operates as user device 12 and further supports the operation of one or more interactive games.

The plurality of user devices 12 and 14 includes the computing core 26 as previously described to support DS processing 34 and other functions such as gaming applications. In addition, one or more user devices 12 further include a memory 100 operating in a similar fashion to DS units 36 to store dispersed storage data. For example, the computing core 26 executes the gaming application and optionally stores gaming data 114 such as game state information (e.g., status of play), changes in game state from prior game states, game character information or settings, game configuration data or other game data, in the memory 100.

The DS processing unit 16 includes the computing core 26 and cache memory 102 to support DS processing 34 and other functions such as gaming applications. For example, the computing core 26 executes the gaming application and stores, in the cache memory 102, gaming data 114 such as game state information (e.g., status of play) or other game data.

The plurality of user devices 12 or 14 may communicate data with each other, the DS processing unit 16, and/or the DSN memory 22 via the network 24. The data may be comprised of EC data slices compatible with the dispersed storage network. The data may represent gaming data 114 such as game state information or other game data. For example, two user devices 12 or 14 executing a same game session (e.g., playing a group game against each other) exchange gaming data 114 with each other and send gaming data 114 to the DS processing unit 16 for further processing and/or storage (e.g., storing game state information).

The DSN memory 22 includes the plurality of DS units 36 and may functionally include one or more of the memories of the plurality of user devices 12 to store slices. For instance, the plurality of user devices 12 may function as DS units 36 storing slices. DS units 36 may be geographically aligned with locations of groups of user devices 12 or 14. For example, twenty DS units 36 may be aligned in Chicago where there are two hundred thousand user devices 12 or 14 that actively participate in a first group of gamers, and ten DS units 36 may be aligned in Milwaukee where there are one hundred thousand user devices that actively participate in a second group of gamers.

In an example of operation, the user device creates gaming data 114 and sends it to the DS processing unit 16. The DS processing unit 16 processes the gaming data 114 to produce processed information (e.g., ads, flags, game status, etc.). The DS processing unit 16 creates EC data slices 45 based on the processed information. The DS processing unit 16 sends the EC data slices 45 to the DSN memory 22 with a store command. At least one of the user devices 12 or 14 may send a message to the DS processing unit 16 that contains a request for processed information. The DS processing unit 16 may send a portion of the processed information and/or the EC data slices 45 of the processed information to one or more of the user devices 12 or 14 based on the request and/or based on another factor (e.g., a push data indicator, from time to time, a priority, a user device joins or exits a game session, etc.).

In another example of operation, the DS processing unit 16 is implemented in a user device 12" that creates gaming data 114 and processes the gaming data 114 to produce processed information. The user device 12" creates EC data slices 45 based on the processed information. The user device 12" sends the EC data slices 45 to the DSN memory 22 with a store command. At least one of the other user devices 12 may send a message to the user device 12" that contains a request for processed information. The user device 12" may send a portion of the processed information and/or the EC data slices 45 of the processed information to one or more of the other user devices 12 based on the request and/or based on another factor (e.g., a push data indicator, from time to time, a priority, content of the processed gaming data, a user device joins or exits a game session).

In a further example, game data 114 is received at the dispersed storage processing unit 16 and stored in cache memory 102. Dispersed storage processing unit 16 generates a data block based on the cached game data 114 and further based on dispersed storage metadata that is generated for the data block, based on the cached game data. The data block can then be stored in the dispersed storage network via EC slices 45 stored in a plurality of DC units 36 or memories 100.

In one mode of operation, the dispersed storage processing unit 16 determines when to generate a new data block. For example, game data 114 can be accumulated until a full pack of data is received, or until the amount of game data 114 cached corresponds to the desired size of a data block. In other modes of operation, the dispersed storage processing unit 16 can track and update a remaining cache capacity of the cache and trigger either the generation of data blocks, when the remaining cache capacity exceeds a threshold. In a further mode of operation, dispersed storage processing unit 16 can include a timer that tracks the time since the receipt of the last gaming data 114. A data block can be generated and stored and the cache can be purged when no additional gaming data 114 has been received within a time out period. In another mode of operation, the dispersed storage processing unit can analyze the gaming data 114 to identify a particular game event, such as a user entering the game, a user exiting the game, the users requesting to save the game, an event associated with the game itself, such as a user advancing to a higher level or to a new map, or other game event. The identification of the game event can be used to trigger the generation and/or storage of the data block by the dispersed storage processing unit 16.

In another example of operation, the dispersed storage processing unit 16 can choose where the EC slices 45 of the data blocks will be stored, based on information associated with the gaming data 114. In an embodiment of the present invention, the gaming application associates the users of user devices 12 or 14 into affinity groups, by location (e.g. Chicago, or Milwaukee, etc.), by game (e.g. Halo, Tour of Duty, Super Mario Brothers, etc.), or by a particular game session among particular players.

A number of dispersed storage units 36 (or memories 100) can be associated with a particular affinity group based on a group ID or other identifier. When gaming data 114 is received from a user of a particular user device 12 or 14, an affinity group that is associated with the user, the user device 12 or 14, or a group ID included within the gaming data 114 can be identified by the dispersed storage processing unit 16 and used to determine the particular dispersed storage units 36 or memories 100 to be used to store the EC slices 45 generated therefrom. For example, the dispersed storage processing unit 16 can determine a user, via their association with the user device that generated the gaming data 114 or from data contained in the gaming data 114, itself. An affinity group can be identified that includes the user and the dispersed storage processing unit 16 can determine the particular dispersed storage units 36 or memories 100 to be used to store the gaming data 114 based on their association with the affinity group that is identified.

In another example of operation, dispersed storage units 36 or memories 100 can be associated to user devices 12 or 14 or particular users based on other criteria such as subscription data, fee structures, a desired level of data integrity or security, geographical location (e.g. the proximity of a the user device that generated the gaming data 114 to a particular memory 100 or DS storage unit 36) or other criteria. In this further example, the dispersed storage processing unit 16 uses these associations to determine the particular dispersed storage units 36 or memories 100 to be used to store the EC slices 45 generated therefrom.

In a further example of operation, the dispersed storage processing unit 16 receives a request from a player, the request associated with one of the user devices 12 or 14. The dispersed storage unit 16 determines if the request is associated with an existing game or a new game, based on a game ID or other data included in the request. When an existing game is requested, a gaming data 114 such as a game state or other game data associated with the existing game is retrieved from the dispersed storage network 16 by dispersed storage processing unit 16. The gaming data 114 is modified to include the player; and the modified gaming data 114 is stored in the dispersed storage network by dispersed storage processing unit 16. In addition, the dispersed storage processing unit 16 can send the modified gaming data 114 to user device 12 or 14 associated with the player that requested to enter the game and to the user device 12 or 14 associated with other players in the game.

In the example discussed above, where the players request is not for an existing game, and instead, is for a new game, the dispersed storage processing unit 16 generates new gaming data 114, such as a new game state or other gaming data that includes the player. The new game data 114 can be stored in the dispersed storage network via the dispersed storage processing unit 16 and sent to the user device 12 or 14 associated with the player that generated the request. In particular, the dispersed storage processing unit 16 can determine which DS units 36 and memories 100 to be used to store the EC slices generated based on the new gaming data 114 using any of the techniques previously described, such as association to the game or game session, associated to the player, the proximity to the location of the user device 12 or 14 associated with the player, one or more other affinity groups that include the player, etc.

Further examples of creation and distribution of gaming data 114, including several optional functions and features will be discussed in greater detail with reference to FIGS. 10-11.

Figure 10:
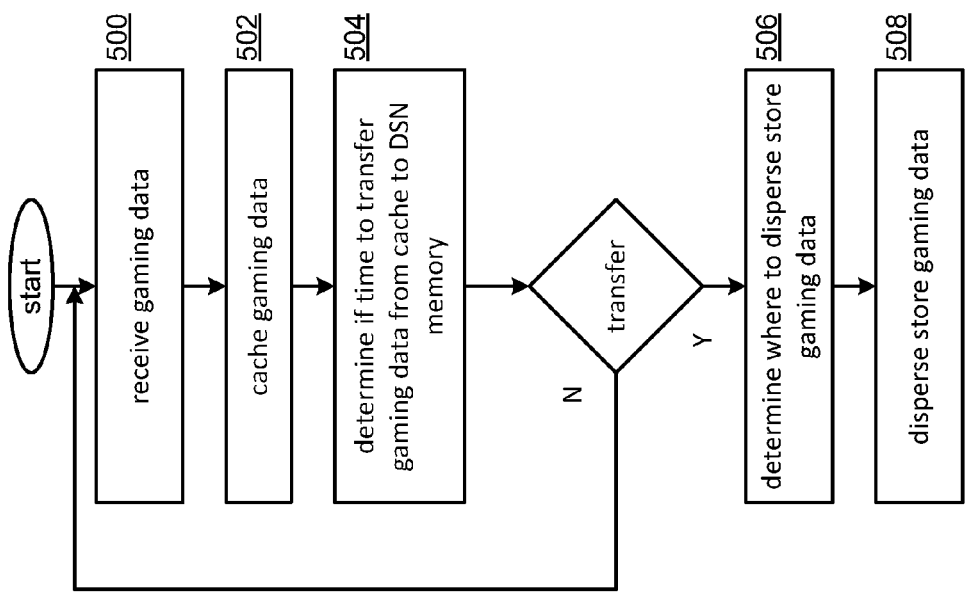
FIG. 10 is a flowchart illustrating the storing of gaming data in accordance with an embodiment of the invention.

FIG. 10 is a flowchart illustrating the storing of gaming data, such as gaming data 114, via a DS processing unit 16 included in game server 120 or user device 12". The DS processing unit 16 receives the gaming data from one or more user devices 12 or 14 and/or another unit or element of the system as shown in step 500. In particular, the gaming data may be received at the beginning of a new game session, from time to time during the game session (e.g., a stream of updates to the gaming data from one or more of the user devices), or after the conclusion of the game session.

The gaming data may include one or more of a game ID, game session ID, player ID, start time, game time, game state of play, and/or player state of play. Note that a game session ID may identify a particular instance of a game application running on one or more user devices where the one or more user devices interact with each other (e.g., compete against each other, team with each other for a shared goal).

In step 502, the DS processing unit stores the gaming data in cache memory and may append the gaming data just received to a record already in the cache memory of similar gaming data received earlier (e.g., for the same active game session). Note that as time goes on the use of the cache will grow. For example, the cache may grow for game session X101 as user devices participating in game session X101 send gaming data to the DS processing unit.

In step 504, the DS processing unit determines if it is time to transfer the gaming data from the cache memory to DSN memory. The determination may be based on one or more of cache memory utilization has reached a threshold, a request, game time, game state of play, player state of play, and/or a time period has elapsed since the last transfer of gaming data for this game session. The DS processing unit continues to receive gaming data when the DS processing unit determines it is not time to transfer the gaming data from the cache memory to DSN memory.

In step 506, the DS processing unit determines what part of the DSN memory to utilize to store the gaming data from the cache memory when the DS processing unit determines it is time to transfer the gaming data from the cache memory to DSN memory. Note that the DSN memory may include DS units and the memory of one or more user devices. The determination may be based on the game ID (e.g., use predetermined DS units for certain games), an affiliation between the player ID and DSN memory (e.g., similar geographic locations), game time, game state of play, player state of play, and/or the availability of the DSN memory. For example, the DS processing unit may choose DS units near Las Vegas and memory of user devices affiliated with game session X101 near Las Vegas when gaming data pertaining to game session X101 is to be transferred from cache memory to DSN memory.

In step 508, the DS processing unit creates EC data slices of the gaming data in cache memory and sends the slices to the chosen portion of the DSN memory (e.g., DS units and/or memory of one or more user devices) with a store command.

In another embodiment, the DS processing unit sends the gaming data from the cache memory to the one or more user devices affiliated with the same game session ID. In yet another embodiment, the DS processing unit creates EC data slices of the gaming data from the cache memory and sends the slices to a different portion of the DSN memory. The DS processing unit sends a message to the one or more user devices affiliated with the same game session ID containing the virtual address of the different portion of the DSN memory such that the user device can subsequently retrieve the gaming data.

Figure 11:
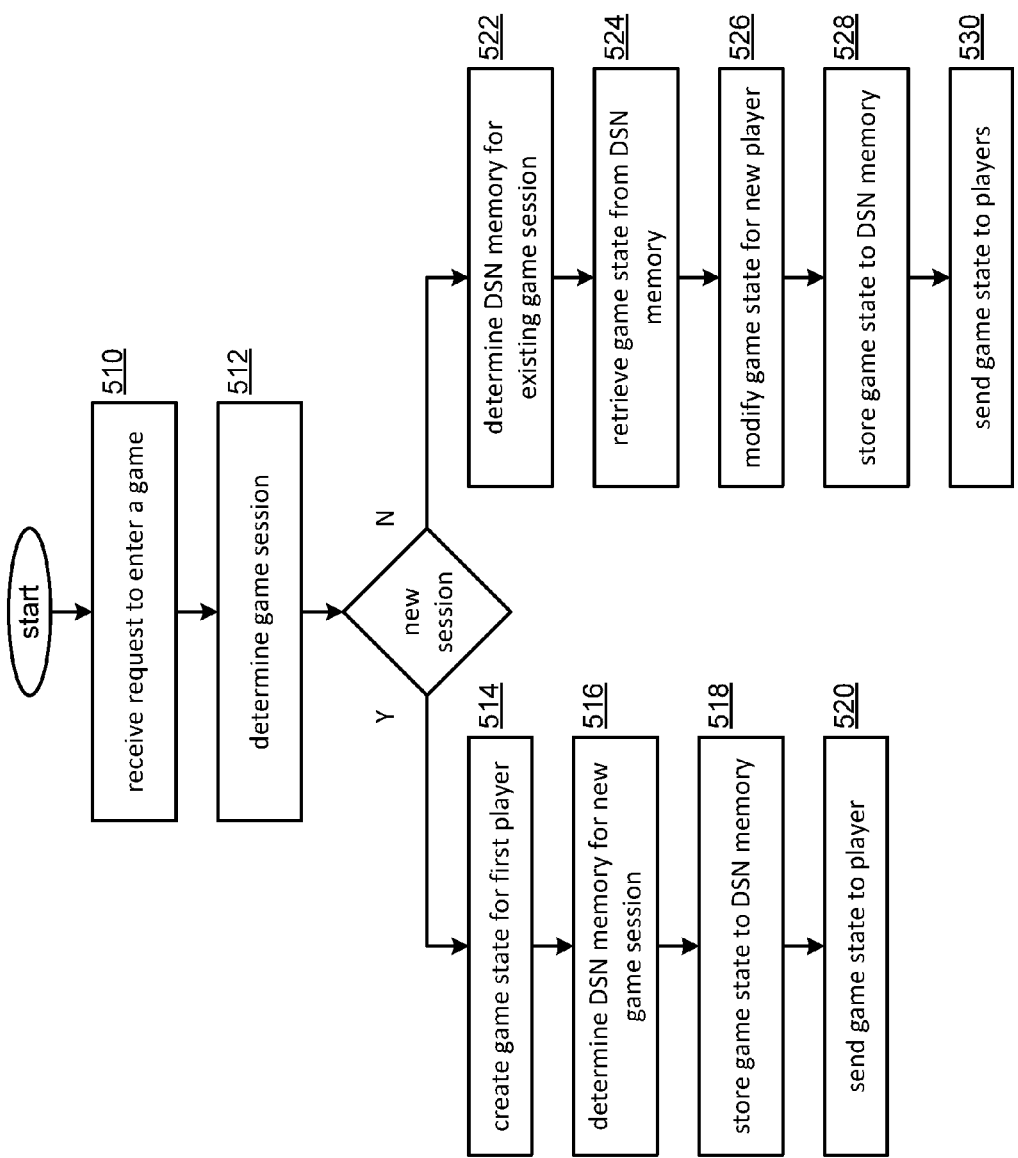
FIG. 11 is another flowchart illustrating the storing of gaming data in accordance with an embodiment of the invention.

FIG. 11 is another flowchart illustrating the storing of gaming data where the DS processing unit 16 included in game server 120 or user device 12" receives a game request as shown in step 510. The request to enter a game can originate from one or more user devices 12 or 14 and/or another unit or element of the system.

The game request may include the player ID, the game ID, the game session ID, the game state of play, the player state of play, the game time, and a scenario indicator. Portions of the request may specify an ID or a wildcard (e.g., any game session, any game, any state of game etc.). The scenario indicator may indicate that the user device desires to start a new game session (e.g., at the beginning, or at some game state of play beyond the beginning), join an already in progress live game session, or enter a previously played game session based on the game state of play (e.g., rerun a game session stored in the DSN memory).

In step 512, the DS processing unit determines the game session based on one or more of the game request, the game state of active game sessions, and/or the gaming data stored in the DSN memory. For example, the scenario indicator may indicate the user device is requesting to initiate a new game session. In another example, the scenario indicator may indicate that the user device is requesting to join any active game session in progress of a particular game ID. The DS processing unit determines the active game sessions for the game ID by a table look up of active game sessions in cache memory and/or from the DSN memory and may randomly choose a game session. In another example, the scenario indicator may indicate that the user device is requesting to recreate a previously played game session. The DS processing unit determines the game session ID based on the request and searching the DSN memory for the matching gaming data (e.g., the request may not fully specify the game session ID).

The DS processing unit carries out the following steps when the DS processing unit determines the game session to be new. In step 514, the DS processing unit creates the initial game state of play based on the game request and parameters of the game. In step 516, the DS processing unit determines the DSN memory for the new game session. The determination may be based on one or more of the player ID, the game ID, performance requirements, and/or DSN memory availability. For example, the DS processing unit may choose DSN units near the user device associate with the player ID and may include the memory of the user device.

The DS processing unit bundles the game state of play and any other game data (e.g., player ID, game ID, game session ID, virtual address of DSN memory, game state of play, player state of play, etc.) to create initial gaming data for this new game session. In step 518, the DS processing unit creates EC data slices of the gaming data and sends the slices and a store command to the DSN memory.

In step 520, the DS processing unit sends the gaming data to the user device. In another embodiment, the DS processing unit sends the virtual DSN address of the gaming data to the user device such that the user device may subsequently access the gaming data directly from the DSN memory.

The DS processing unit carries out the following steps when the DS processing unit determines the game session not to be new. In step 522, the DS processing unit determines the DSN memory for the existing game session. The game session may be live or not live with gaming data stored in the DSN memory. The determination may be based on one or more of the player ID, the game ID, game state of play, player state of play, and/or the game session ID. For example, the DS processing unit may search the DSN memory for the best match.

In step 524, the DS processing unit retrieves the gaming data from the DSN memory. The DS processing unit may determine if the age of the gaming data is beyond an age threshold (e.g., too old) and the DS processing unit may retrieve current gaming data from the current user devices engaged in the game session when the gaming data is beyond the age threshold. In another embodiment, the DS processing unit may send a suspend game request to the current user devices engaged in the game session to further synchronize the addition of a new player to an existing game session.

In step 526, the DS processing unit modifies the gaming data to reflect the addition of the new player ID. In another embodiment, the game request includes an indicator to add one or more automated players (e.g., players hosted by the DS processing unit). The DS processing unit initiates the automated player and modifies the gaming data accordingly.

In step 528, the DS processing unit creates EC data slices of the gaming data and sends the slices and a store command to the DSN memory.

In step 530, the DS processing unit sends the gaming data to the user device (e.g., to the affected players). In another embodiment, the DS processing unit sends the virtual DSN address of the gaming data to the user device such that the user device may subsequently access the gaming data directly from the DSN memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for use in conjunction with a dispersed storage processing unit coupled to a data network, the method comprising:
   receiving a request for a player to enter a game at the dispersed storage processing unit, the request associated with at least one of a plurality of user devices;
   determine at the dispersed storage processing unit when the game requested is an existing game and, when the existing game is requested:
   retrieving, via slices, from a plurality of storage devices at a corresponding plurality of different locations of a dispersed storage network, a game state associated with the existing game;
   modifying the game state at the dispersed storage processing unit to include the player; and
   storing the modified game state in the dispersed storage network.

2. The method of claim 1 further comprising:
   sending the modified game state to the player via the data network.

3. The method of claim 1 further comprising:
   sending the modified game state to at least one other player associated with the existing game, via the data network.

4. The method of claim 1 further comprising:
   determine at the dispersed storage processing unit when the game requested is not an existing game and when the game requested is not an existing game:
   generating a new game state to include the player;
   storing the new game state in the dispersed storage network.

5. The method of claim 4 further comprising:
   sending the new game state to the player via the data network.

6. The method of claim 4 further comprising:
   determining a plurality of dispersed storage units for use in storing the new game state;
   wherein storing the new game state in the dispersed storage network includes storing slices formed from the new game state in the plurality of dispersed storage units.

7. The method of claim 6 wherein the determination of the plurality of dispersed storage units includes:
   determining a location associated with the at least one of the plurality of user devices; and
   identifying at least one of the plurality of dispersed storage units based on proximity to the at least one of the plurality of user devices.

8. The method of claim 6 wherein the determination of the plurality of dispersed storage units includes:
   associating at least one of the plurality of dispersed storage units to the player; and
   identifying at least one of the plurality of dispersed storage units based on its association to the player.

9. The method of claim 6 wherein the determination of the plurality of dispersed storage units includes:
   associating at least one of the plurality of dispersed storage units to a new game; and
   identifying at least one of the plurality of dispersed storage units based on its association to the new game.

10. The method of claim 6 wherein at least one of the plurality of dispersed storage units includes a memory associated with the at least one of the plurality of user devices.

* * * * *